US012754120B2

(12) United States Patent
Mcculloch et al.

(10) Patent No.: US 12,754,120 B2
(45) Date of Patent: Oct. 6, 2026

(54) METHOD AND SYSTEM FOR MONITORING LIQUID-LIQUID EXTRACTION

(71) Applicant: TRIAD National Security, LLC., Los Alamos, NM (US)

(72) Inventors: Quinn Mcculloch, Los Alamos, NM (US); George S. Goff, Los Alamos, NM (US); Andrew P. Shreve, Santa Fe, NM (US)

(73) Assignee: Triad National Security, LLC, Los Alamos, NM (US)

( * ) Notice: Subject to any disclaimer, the term of this patent is extended or adjusted under 35 U.S.C. 154(b) by 247 days.

(21) Appl. No.: 17/977,233

(22) Filed: Oct. 31, 2022

(65) Prior Publication Data

US 2023/0135792 A1 May 4, 2023

Related U.S. Application Data

(60) Provisional application No. 63/273,366, filed on Oct. 29, 2021.

(51) Int. Cl.
*G01N 15/06* (2024.01)
*G01N 15/075* (2024.01)
(Continued)

(52) U.S. Cl.
CPC ............. *G01N 15/06* (2013.01); *G01N 21/41* (2013.01); *G01N 21/4133* (2013.01);
(Continued)

(58) Field of Classification Search
CPC .... G01N 15/06; G01N 15/075; G01N 21/253; G01N 21/41; G01N 21/4133; G01N 2021/416; G01N 2021/1765
See application file for complete search history.

(56) References Cited

U.S. PATENT DOCUMENTS 10,351,905 B2 * 7/2019 Link ...................... C12Q 1/686
12,235,262 B1 * 2/2025 Giresi ................ G01N 33/6842
(Continued)

OTHER PUBLICATIONS

D Brennan et al 2008 Meas. Sci. Technol. 19 085403 DOI 10.1088/0957-0233/19/8/085403 (Year: 2008).*
(Continued)

*Primary Examiner* — Kara E. Geisel
*Assistant Examiner* — Jonathon Cook

(57) ABSTRACT

A system includes a light source, a transparent container, a detector, and a processor. The light source emits light. Liquid flows from one end of the transparent container to another end of the transparent container. The liquid comprises a first and a component. One or more droplets containing the second component are formed within the transparent container as the liquid flows from the one end to the another end of the transparent container. The detector measures light intensities from the transparent container being illuminated. The one or more droplets cast shadows on the detector. A light intensity associated with a portion of the liquid that includes the one or more droplets is different from a second light intensity associated with another portion of the liquid that does not include the one or more droplets. The processor processes the measured light intensities to determine phase entrainment metrics associated with the liquid.

16 Claims, 18 Drawing Sheets

(51) Int. Cl.
*G01N 21/17* (2006.01)
*G01N 21/41* (2006.01)

(52) U.S. Cl.
CPC ... *G01N 15/075* (2024.01); *G01N 2021/1765* (2013.01); *G01N 2021/416* (2013.01)

(56) References Cited

U.S. PATENT DOCUMENTS

| | | | | |
|---|---|---|---|---|
| 2007/0017291 | A1* | 1/2007 | Cypes | B01D 3/322<br>73/590 |
| 2011/0036177 | A1* | 2/2011 | Pinguet | G01F 1/74<br>73/861.04 |
| 2014/0200164 | A1* | 7/2014 | Makarewicz, Jr. | B01F 23/41<br>506/40 |
| 2017/0370896 | A1* | 12/2017 | Arifin | G01N 21/359 |
| 2019/0033301 | A1* | 1/2019 | Bornhop | G01N 33/536 |
| 2022/0080424 | A1* | 3/2022 | Akhremichev | B01F 25/431 |
| 2023/0191413 | A1* | 6/2023 | Arter | B01L 3/502784<br>436/172 |
| 2024/0286127 | A1* | 8/2024 | Lim | B01L 3/5023 |

OTHER PUBLICATIONS

Vinh Tran, Sujit K. Sahoo, Dong Wang, Cuong Dang, Utilizing multiple scattering effect for highly sensitive optical refractive index sensing, Sensors and Actuators A: Physical, vol. 301, 2020, 111776, ISSN 0924-4247, https://doi.org/10.1016/j.sna.2019.111776 (Year: 2020).*

Jing Tang, Xubin Zhang, Wangfeng Cai, Fumin Wang, Liquid-liquid extraction based on droplet flow in a vertical microchannel, Experimental Thermal and Fluid Science, vol. 49, 2013, pp. 185-192, ISSN 0894-1777, https://doi.org/10.1016/j.expthermflusci.2013.04.017 (Year: 2013).*

* cited by examiner

METHOD AND SYSTEM FOR MONITORING LIQUID-LIQUID EXTRACTION

RELATED APPLICATIONS

The instant application claims the benefit of and priority to the U.S. Provisional Application No. 63/273,366 filed on Oct. 29, 2021, which is incorporated herein by reference in its entirety.

ACKNOWLEDGEMENT OF GOVERNMENT SUPPORT

This invention was made with government support under Contract No. 89233218CNA00000 awarded by the U.S. Department of Energy. The government has certain rights in the invention.

BACKGROUND

Liquid-liquid extraction (LLE) is a method of separating or purifying dissolved materials by taking advantage of their respective solubilities in immiscible liquids. LLE may be used in separating biomolecules, lipid and fatty acids, impurities from water and beverages, metal complexes from mixed aqueous streams, radioisotopes, etc. Appearance of phase entrainment (also referred to as phase carryover) may be an indication of LLE system failure, e.g., microfluidic device failure, millifluidic device failure, etc., when a liquid phase exits the wrong outlet port, e.g., unwanted liquid appears at the outlet port of the opposite phase. Phase entrainment is the result of flow conditions of the system and the physical properties of the liquids involved, and is an indicator of flow stability. The volume fraction of such phase entrainment can provide valuable information regarding the degree of failure and the ability to recover phase separation once phase entrainment has occurred.

Although phase entrainment may be seen in certain circumstances in transparent tubing with the naked eye, it is not only difficult to quantify it in real time but it is also impractical to monitor over long periods of time by collecting large volumes of outlet fluids and measuring phase ratios ex-situ. Moreover, since many liquids appear to be similar to one another by the naked eye, it can be difficult to identify whether phase entrainment is present. Even if phase entrainment is successfully identified, it is difficult to quantify solute concentration by the naked eye in a fluid stream.

In recent years, the use of sensors have become prevalent in monitoring flow for process automation and optimization. For example, sensors for hot wire anemometry, shear force measurement, charge pulse injection and ionic species detection, pressure differential sensing, detection of Coriolis forces, and observance of fluorescence and photobleaching, etc., have been successfully used for continuous liquids. Unfortunately, the efficacy of the sensors for continuous liquids is hampered when more than one phase is present because of variability in viscosity, density, transport coefficients, and the appearance of interfacial and capillary forces.

It is appreciated that the flow may be controlled for droplet monodispersity to perform analysis on materials encapsulated in droplets using sensors, e.g., 2D bright-field and fluorescence microscopy, laser spectroscopy, NMR, electrophoresis, image cross correlation, shadowgraphy, etc. Biphasic microfluidics have been used with capillary number and Reynolds number that are typically small with interface formation that is accurately controlled and is related to dynamic viscosity, phase velocity, density, the system's characteristic length, and interfacial tension. Unfortunately, the sensors used in analyzing the solute concentration within droplets are not only expensive but they also require extensive analysis that renders them impractical for industrial use.

SUMMARY

Accordingly, a need has arisen to quantify phase entrainment, identify bulk phase (pure liquid) presence, and measure solute concentration that is practical for industrial use. According to some embodiments, an optical detector, e.g., a linear CMOS sensor, may be used along with a light source, e.g., LED light source, to illuminate a solution in a transparent container in order to leverage shadowgraphy to quantify phase entrainment, identify bulk phase presence (i.e., determine the purity of the liquid), and/or measure solute concentrations by measuring the light intensity and comparing it to developed models to identify the refractive index that is indicative of respective concentrations. It is appreciated that various techniques including average pixel ratio and/or menisci counting analysis have been used to quantify phase entrainment, identify bulk phase presence, and/or measure solute concentration. The average pixel ratio may be used to identify bulk liquids and their constituents.

In some embodiments, a liquid may be passed through a segment of transparent container (e.g., cylindrical tubing with circular cross section, tubing with rectangular cross section, etc.). Slugs (also referred to as droplets) are formed if two liquids or a liquid and a solute are present as they travel through the container. A light source, e.g., light emitting diode (LED), white light source, laser, etc., illuminates the transparent container that the liquid is traveling through while a detector, e.g., a line sensor such has 1×2048 CMOS pixels, a linear charged coupled detector (CCD) array, etc., captures a "shadow" cast by the droplets (i.e., leading and trailing edge of the droplets). The leading and trailing edge of the droplets cast shadows on the detector, which appear as intensity features (peaks). The number of peaks can be used to quantify carryover (i.e., phase entrainment). The average pixel ratio based on the measured light intensity (that changes due to different refractive indices associated with each liquid and/or slug) can be used to identify bulk phase presence.

It is appreciated that different solute concentrations can result in different refractive indices. These different indices, in addition to the dimensions of the system, e.g., dimensions of the transparent tubing, etc., can lead to variations in light intensity. As such, in embodiments, models (e.g., empirically developed, software generated, etc.) may be developed for a given system setup (i.e., based on specific dimensions) to illustrate correspondence between different liquid concentrations to refractive indices and light intensity. Thus, the system may be leveraged to measure the light intensity and the measured light intensity may be compared to the generated model, or in some embodiments to a comparison sample in real time, to identify the correspondence refractive index and as such concentrations associated with each liquid.

These and other features and aspects of the concepts described herein may be better understood with reference to the following drawings, description, and appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
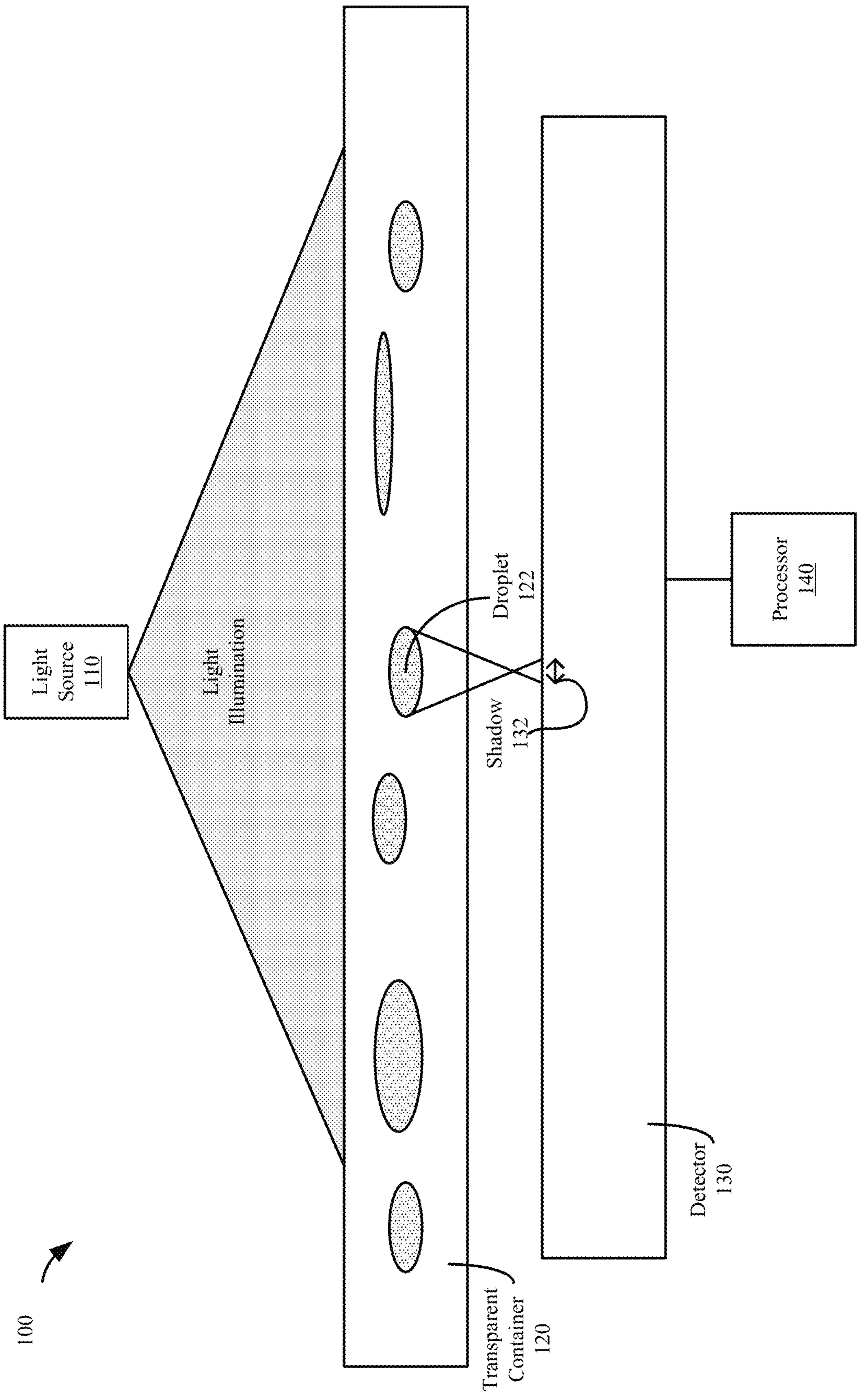
FIG. 1A depicts an example of a diagram of a hardware-based system configured to measure data associated with phase entrainment in a multi-liquid extraction system according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

As described above, a need has arisen to quantify phase entrainment, identify bulk phase (pure liquid) presence, and measure solute concentration that is practical for industrial use. The proposed system leverages less costly detectors (or sensors) to measure volume ratios of microfluidic liquid-liquid streams. The proposed system utilizes the tendency of phase entrainment to appear as slug flow (also referred to as droplets) in a narrow transparent container, e.g., transparent tubing. In some embodiments, the system includes an optical detector, e.g., a linear CMOS sensor, that is used with a light source, e.g., LED light source, to illuminate a solution in a transparent container. It is appreciated that in some nonlimiting examples, the light source may be strobed to illuminate the droplets and measure accurate positions of the droplets in a microfluidic chip, thereby reducing image blurring. The droplets may cast a shadow on the detector when the light source illuminates the transparent tubing. In some embodiments, the light intensity associated with positions of the droplets is different from light intensity where the droplets are absent, as measured by the detector. The variation in light intensities as measured by the detector may form peaks that corresponds to locations of the droplets. The number of droplets (e.g., as measured by the number of peaks also referred to as menisci counting analysis) may be used to quantify phase entrainment. It is appreciated that since the size of the droplets (e.g., dimensions such as length, width, etc.) may vary, another metric may be used for phase entrainment. For example, a ratio of light intensities between where the droplets are present and where the droplets are not present (also referred to as pixel ratio), along the length of the transparent container may be used as an indication of bulk phase presence (i.e., purity of the liquid). It is appreciated that since different liquids have different refractive indices, then the light intensities as measured by the detector varies where the droplets are formed in comparison to where the droplets are absent and can be used as a phase entrainment metric for bulk phase presence.

According to some embodiments, a concentration of different components in a liquid, such as different liquids, in the liquid-liquid extraction system may be determined. For example, a model may be generated (e.g., using software that takes into account the dimensions of the transparent container, the type of liquids in the mixture, etc., to associate light intensities to refractive indices to different concentrations of the types of liquid that are present in the mixture). It is appreciated that in some embodiments, the model may be empirically generated. Once the model is generated, a plurality of light intensities may be measured, as described above. In some embodiments, a statistical averaging may be performed to result in an average light intensity value. The measured average light intensity value may be compared by a processor to the generated model to find a match. Once the light intensity as measured is matched to the light intensity of the generated model, the refractive index and concentrations of the liquids may be determined. In other embodiments, instead of a model, there can be a comparative sample (with known refractive index and concentration) that can be used to make a real time comparison with currently measured values.

Accordingly, various metrics associated with the characteristics of a multi-component liquid such as phase entrainment or solute concentrations may be measured and identified by the proposed system that is less costly than the conventional methods while being more effective and accurate.

Referring now to FIG. 1A, an example of a diagram of a hardware-based system 100 configured to measure data associated with phase entrainment in a multi-liquid extraction system according to one aspect of the present embodiments is depicted. The system 100 includes a light source 110, a transparent container 120, a detector 130, and a processor 140.

In some nonlimiting examples, the light source 110 may be an LED (providing 11.4 mW optical power for example), white light source, laser, etc., that illuminates the transparent container 120 that the liquid is traveling through. In some nonlimiting examples, the light source 110 may generate coherent light. In some embodiments, the light source 110 may be controlled to change the wavelength of the light based on the liquid mixture travelling through the transparent container 120. In some embodiments, the light source 110 may be positioned at 90° angle (i.e., perpendicular) to the transparent container 120 and the detector 130. It is appreciated that the embodiments are described with respect to the emitted light being perpendicular to the transparent container 120 and the detector 130 for illustrative purposes and should not be construed as limiting the scope of the embodiments. For example, in some applications the light source 110 may be positioned at an angle, e.g., 45° angle, 65° angle, etc., with respect to the transparent container 120 and the detector 130 to accentuate the shadow 132 (e.g., enlarge the shadow) being cast on the detector 130.

In some embodiments, the transparent container 120 may be cylindrical in shape or rectangular. However, it is appreciated that the embodiments are described with respect to the transparent container 120 being cylindrical for illustrative purposes and should not be construed as limiting the scope of the embodiments. The transparent container 120 may be made of Teflon fluorinated ethylene propylene (PEF) tubing with an outer diameter of 1.588 mm and an inner diameter of 0.750 mm and 200 mm in length for illustrative purposes. As described above, the dimensions of the transparent container 120 results in the phase entrainment to appear as droplets 122 (slug flow) when the liquid stream flows through the transparent container 120. It is appreciated that the transparent container 120 may act as a lens that changes the focal position as light source 110 illuminate the transparent container 120 and the liquid and/or droplets 122 passing through it. In some nonlimiting examples, the transparent container 120 may bend the light passing through it towards the higher refractive index as the liquid and/or droplets 122 are passing through it. In some nonlimiting examples, the transparent container 120 may attach to an output outlet of a device. As such, in an industrial setting a small portion of the liquid flowing may be diverted as a sample to determine the number of droplets, light intensity to determine concentration of liquid/droplets, etc. The droplets 122 may vary in shape and size as illustrated. In some embodiments, the liquid stream may include two different types of liquid or it may include liquid and solute (e.g., water and sucrose). It is appreciated that any discussion with respect to two types of liquid is for illustrative purposes only and should not be construed as limiting the scope of the embodiments. For example, the proposed system can be extended in liquid extraction that includes more than two liquid types. According to some embodiments, the aqueous phase and an organic phase of the liquid stream may flow into the transparent container 120 via a T-junction (not shown).

It is appreciated that the flow rate may be adjusted depending on the type of liquid(s), dynamic viscosity, interfacial tensions, liquid densities, capillary number, Reynolds number, etc. For example, in some embodiments, involving water and an organic (e.g., toluene) the largest flow rate for water or toluene may be 1000 ul/min given $8.9\times10^{-4}$ Pa·s dynamic viscosity of water, 0.025 N/m interfacial tension between water and toluene, 0.750 mm diameter, water density of 1.0 g/ml, capillary number of $8.80\times10^{-3}$ and Reynolds number of 16 to ensure droplet 122 formation in a squeezing and non-turbulent form.

Figure 1B:
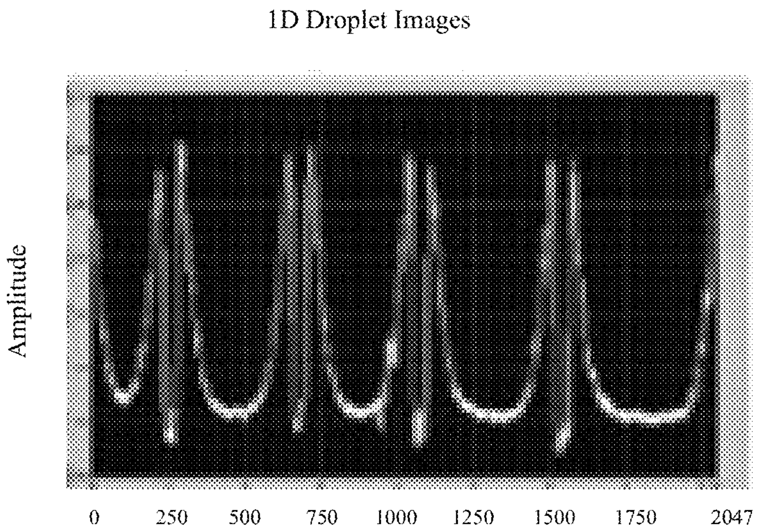
FIGS. 1B-1E depict illustrative results associated with measure data associated with phase entrainment in a multi-liquid extraction system according to one aspect of the present embodiments.

The light source 110 illuminates the transparent container 120 as the liquid flows through the transparent container 120 forming droplets 122. The droplets change the light intensity (or cast a shadow 132) on the detectors 130 due to a different refractive index in comparison to the rest of the liquid mixture. The detector 130 may be an optical detector and in one nonlimiting example is positioned 100 mm from the light source 110. In some embodiments, the detector 130 may be a line sensor such as 1×2048 CMOS pixels (each pixel may be 14×200 microns) with the array length of 28.672 mm which given the 0.75 mm tubing inter diameter provides a 12.7 uL interrogation volume, a linear charged coupled detector (CCD) array, etc., that captures the shadow 132 cast by the droplets 122 (i.e., leading and trailing edge of the droplets). It is appreciated that in some nonlimiting examples, the diameter of the transparent container 120, e.g., a tube, may be small enough, thereby enabling the droplets flowing through to be detected, e.g., inner diameter of a tube being 1 mm enables a droplet with larger radius to be detected. The shadow 132 changes the light intensity that is being measured by the detector 130. In other words, shadows may appear as intensity features (peaks), as shown in FIG. 1B. The number of peaks can be used to quantify carryovers (i.e., phase entrainment). In this example, the processor 140, e.g., a central processing unit (CPU), a field programmable gate array (FPGA), an application specific integrated circuit (ASIC), etc., receives the measured light intensities from the detector 130 for processing. The processor 140 analyzes the measured light intensities. The peaks that are formed are identified as the droplets 122. In this nonlimiting example, the processor 140 identifies ten peaks that correspond to a different light intensity and therefore determines those peaks as droplets 122. It is appreciated that the system 100 may be enclosed in an enclosure (e.g., aluminum enclosure) to reduce exposure to ambient light.

It is appreciated that since the droplets 122 may vary in shape and size, the number of droplets 122 may not be an accurate reflection of phase entrainment. As such, the processor 140 may further perform other types of processing to determine metrics associated with phase entrainment. As discussed above, light intensities as measured by the detector are different in presence of droplets 122 in comparison to absence of droplets 122 regardless of whether a shadow is cast on the detector 130 because the refractive index associated with each is different (e.g., refractive index associated with a first liquid is different from a second liquid). Accordingly, an average pixel ratio based on the measured light intensities associated with each pixel of the linear CMOS detector 130 may be used to determine the bulk phase presence (purity of the liquid). The average pixel ratio may be provided by equation (1) as shown below:

$$\langle R\rangle = \frac{1}{N}\sum_{n=1}^{N}\left(I_n^S/I_n^B\right). \qquad (1).$$

Figure 1C:
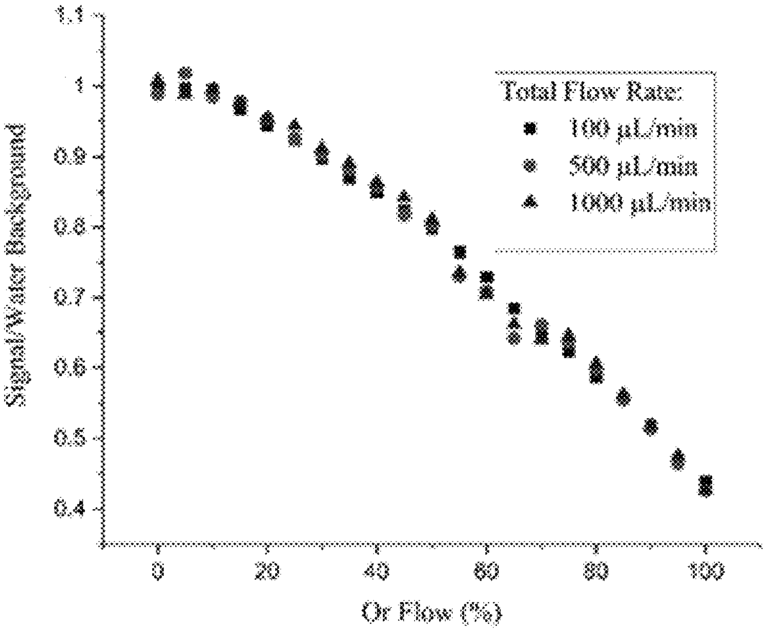

In the equation above R is the average ratio, N is the total number of pixels in the detector 130, n is pixel index, and $I^S$ and $I^B$ are light intensities for signal (e.g., droplet) and background (e.g., bulk) respectively. For illustrative purposes, FIG. 1C shows a ratio (based on equation (1)) for average pixel ratio for water background for different organic concentrations (e.g., toluene in this illustration) for three different flow rates of 100 uL/min, 500 uL/min, and 1000 uL/min.

Figure 1D:
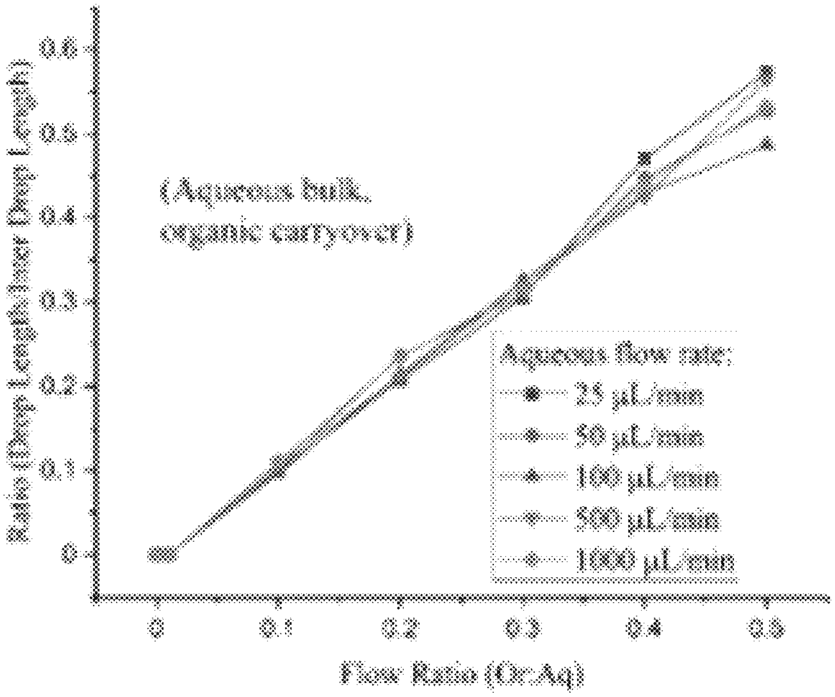
Figure 1E:
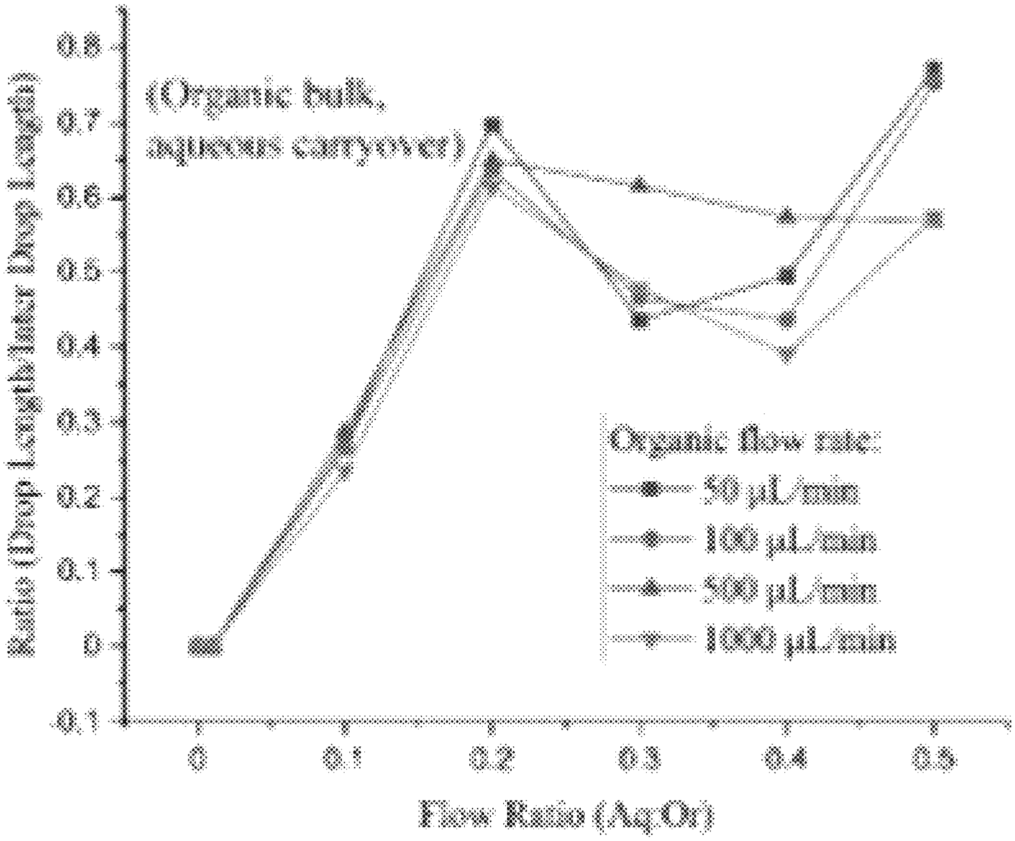

In some nonlimiting examples the processor 140 may further perform other types of processing to determine metrics associated with phase entrainment similar to the pixel ratio that was described above. In some nonlimiting examples, the length of the droplets may also be used as another metric for phase entrainment analysis to determine volumetric ratios. The volumetric ratio may be provided by equation (2) below:

$$\text{Ratio} = \frac{N_{Droplet} \times l}{2048 - N_{Droplet} \times l}. \tag{2}$$

Where $N_{Droplet}$ let is the number of droplets within the transparent container 120, 1 is the average length of the droplet, and 2048 are number of pixels for the detector 130. For illustrative purposes, FIG. 1D shows a volumetric ratio (based on equation (2)) for aqueous bulk and organic carryover for different flow rates of 25 uL/min, 50 uL/min, 100 uL/min, 500 uL/min, and 1000 uL/min. For illustrative purposes, FIG. 1E shows a volumetric ratio (based on equation (2)) for organic bulk and aqueous carryover for different flow rates of 25 uL/min, 50 uL/min, 100 uL/min, 500 uL/min, and 1000 uL/min.

It is therefore appreciated that the length of the droplets may be measured, the average light intensity across the CMOS detector 130 may be measured, the number of peaks may be measured, etc. As such, use of the one or more of the factors above by the processor 140 may determine the amount of liquid versus slug or droplets. It is appreciated that the embodiments are not limited thereto and that the embodiments should not be construed as limited to liquid and droplets. For example, a similar approach may be used for one type of liquid (with a solute in the liquid) versus another type of liquid due to difference in their refractive index resulting in a change in light intensity.

In some nonlimiting examples, various species in liquid flowing may be partitioned by monitoring liquid flowing through the transparent container 120 and by processing the droplets/light refractive index. One application may be in petroleum industry to partition various species in liquid flowing through the transparent container. It is appreciated that in some nonlimiting examples, a different detector 130 may be used. For example, in some embodiments instead of using a linear CMOS detector, a liquid detector may be used, which is a photo interrupter and u-shaped that is placed on one side of a receiver. In yet another example, a refractive or scattering detector (configured to sense refractive index or scattered light) that may be used to detect species within the liquid and/or droplets within the liquid. In some embodiments, various factors may be used to identify a suitable detector to use. For example, the fluorescence, remission, and/or absorption associated with the liquid flowing through the transparent container may be considered to determine an appropriate detector to use.

It is appreciated that the images may be successively captured at a framerate of 1 Hz for illustrative purposes. However, a different framerate may be used and the particular framerate of 1 Hz is for illustrative purposes and should not be construed as limiting the scope of the embodiments.

Figure 2A:
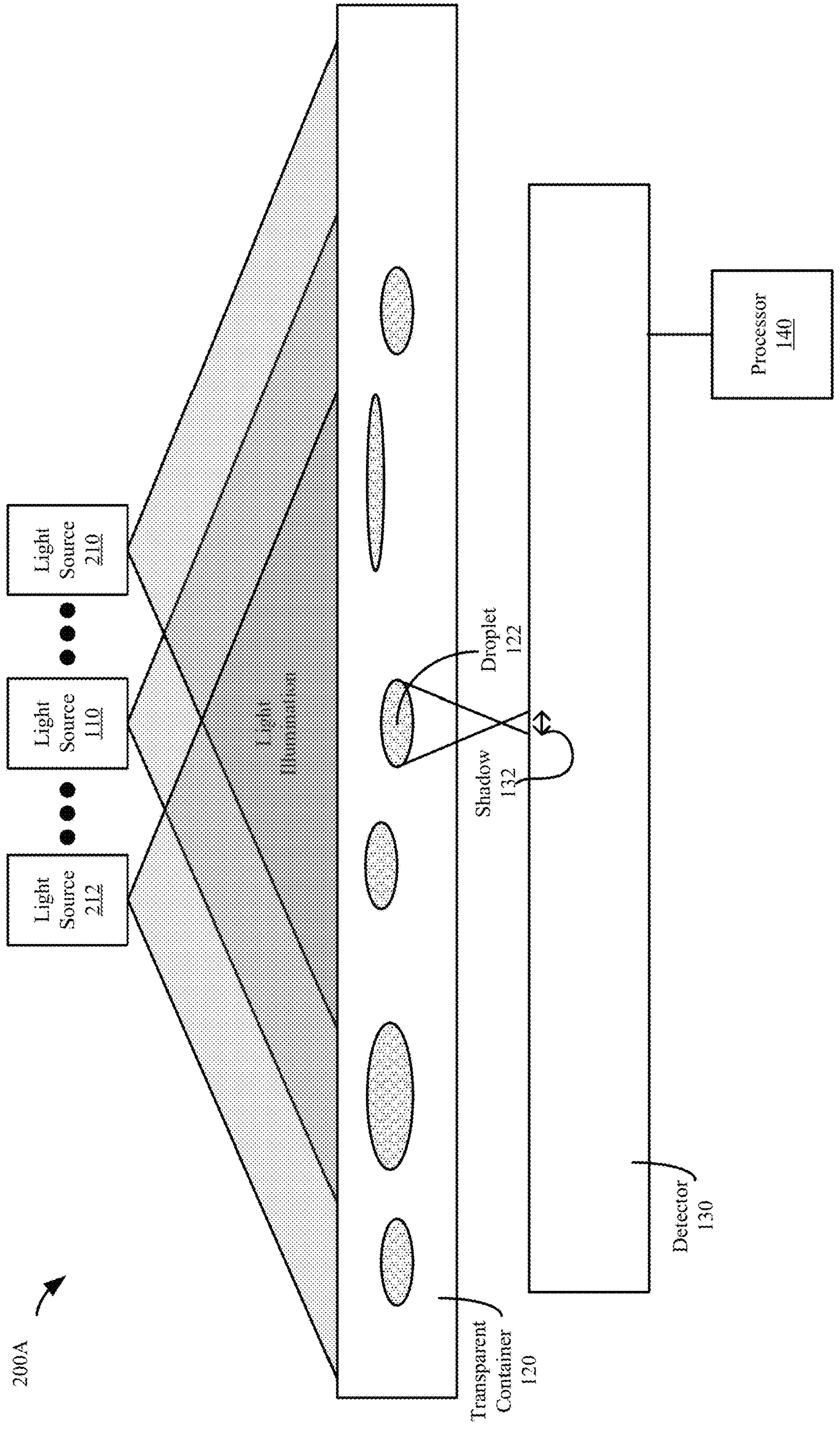
FIGS. 2A-2J depict illustrative variations of a diagram of a hardware-based system configured to measure data associated with phase entrainment in a multi-liquid extraction system according to one aspect of the present embodiments.

Referring now to FIGS. 2A-2J, illustrative variations of a diagram of a hardware-based system configured to measure data associated with phase entrainment in a multi-liquid extraction system according to one aspect of the present embodiments are depicted. Referring to FIG. 2A, the system 200A is similar to that of FIG. 1A. However, in this embodiment, more than one light source is used. For example, any number of light sources such as light source 212, light source 210, . . . , light source 110 may be used. It is appreciated that each light source may be the same or different. For example, in some embodiments, the light source 212 may generate light with a first wavelength while the light source 210 may generate light with a second wavelength, etc. Moreover, it is appreciated that the wavelength of the lights being emitted from each light source may be individually controlled and changed as needed. It is also appreciated that the light sources may be positioned at various angles, e.g., light source 212 may be at a 45° angle while light source 210 may be at 30° angle. The light emitted from the light sources may overlap one another. The choice of wavelength, angle, etc., for the one or more light sources may depend on the types of liquid that are present (e.g., a first type of liquid and a second type of liquid that form the liquid mixture) or the type of soluble and liquid that are present because depending on the components, the absorption rate of various light wavelengths is different resulting in different measured light intensities and hence different information regarding metrics associated with phase entrainment.

Figure 2B:
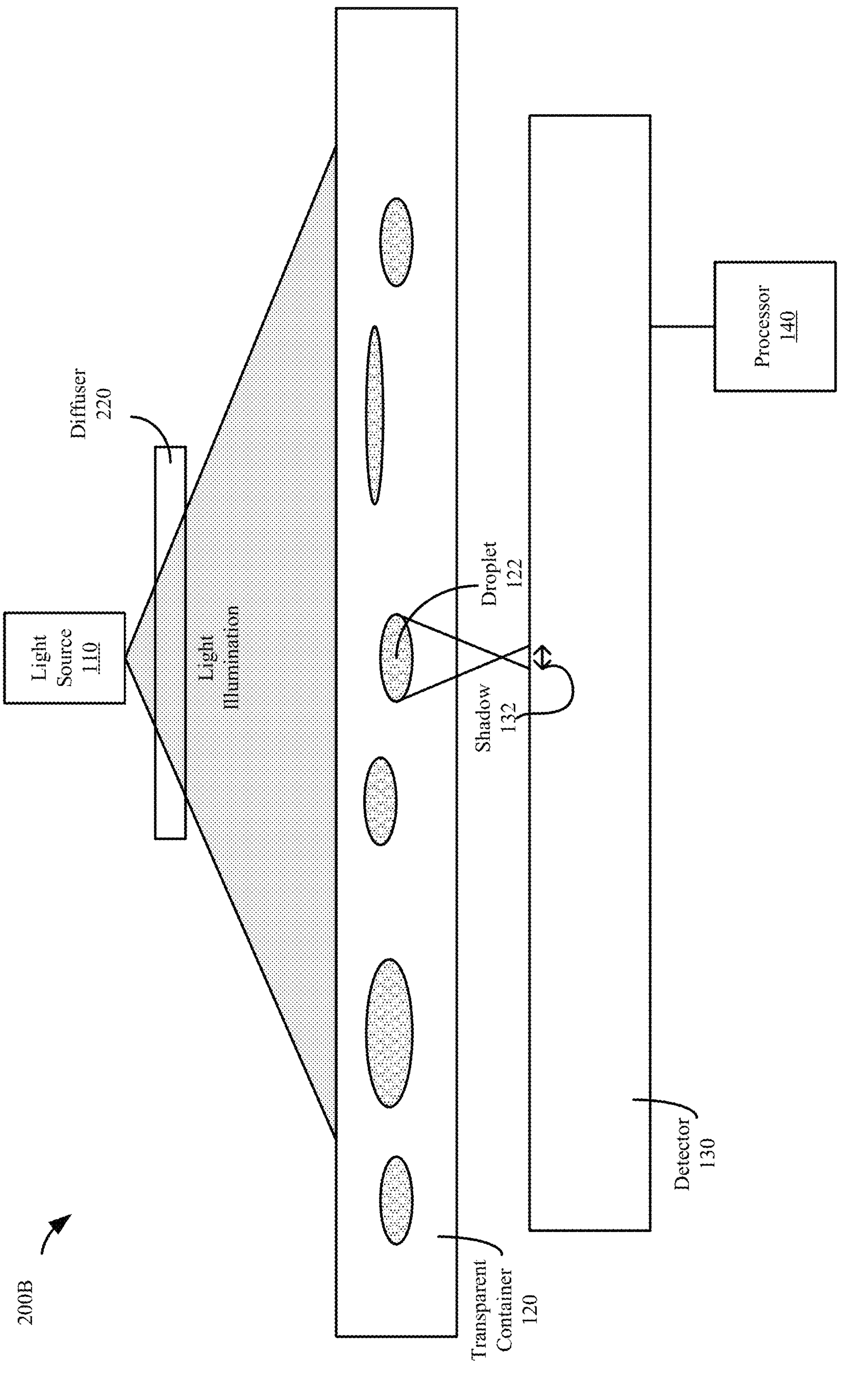

The system 200B of FIG. 2B is similar to that of FIG. 1A except that in this embodiment a diffuser 220 is coupled to the light source 110. The diffuser 220 may homogenize the light emitted from the light source 110. In this nonlimiting example, the diffuser 220 is a 0.89 mm thick Teflon Polytetrafluoroethylene (PTFE) that is positioned 30 mm from the light source 110.

Figure 2C:
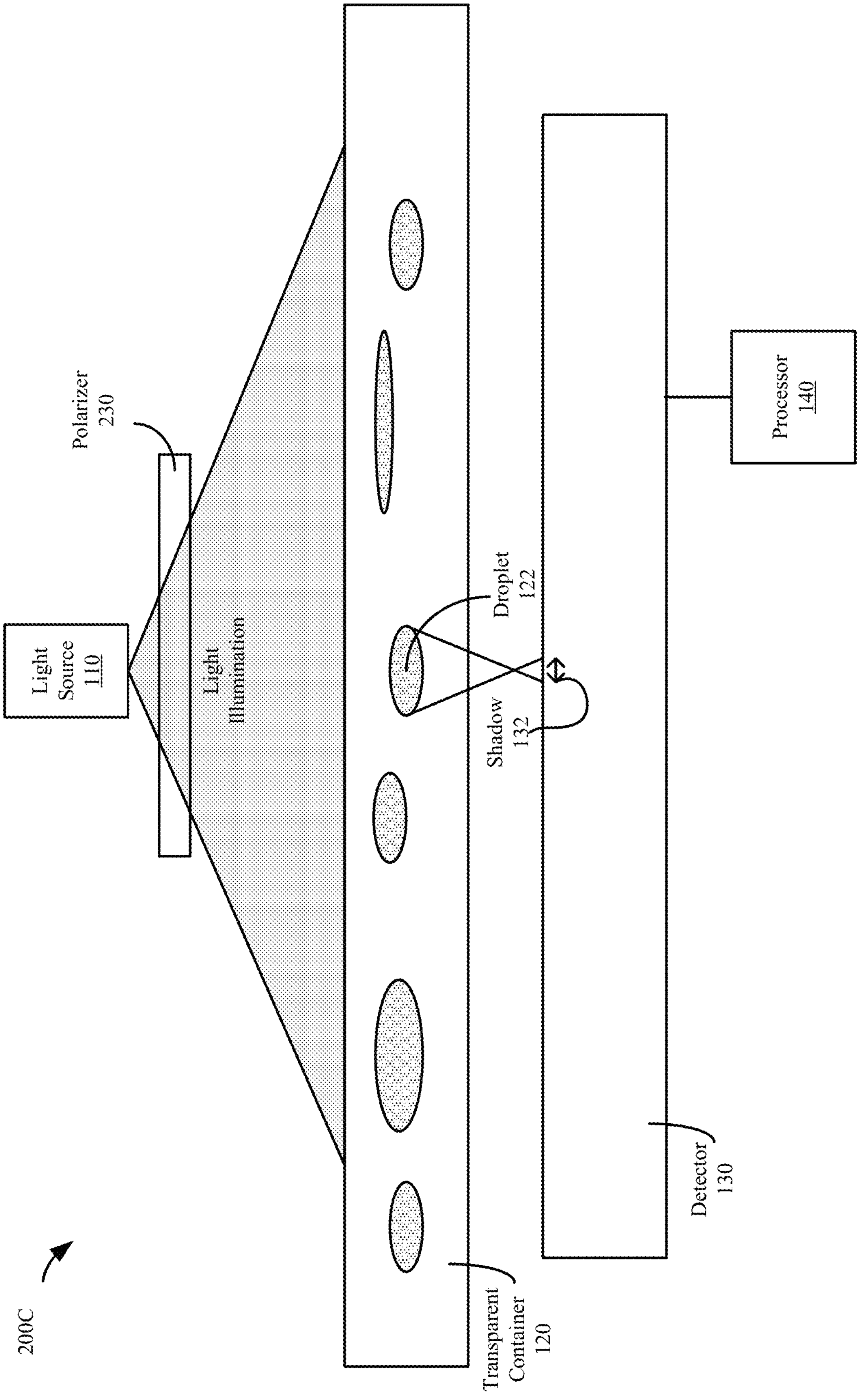

The system 200C of FIG. 2C is similar to that of FIG. 1A except that in this embodiment a polarizer 230 is coupled to the light source 110. The polarizer 230 may polarize the light emitted from the light source 110 to allow lights with certain polarization to travel through and to filter out the rest. In some applications, polarization of the light may be chosen based on the material within the liquid(s) and/or solute(s) of the liquid mixture such that particular information about the components in the liquid, e.g., phase entrainment or solute concentration can be captured from the system.

Figure 2D:
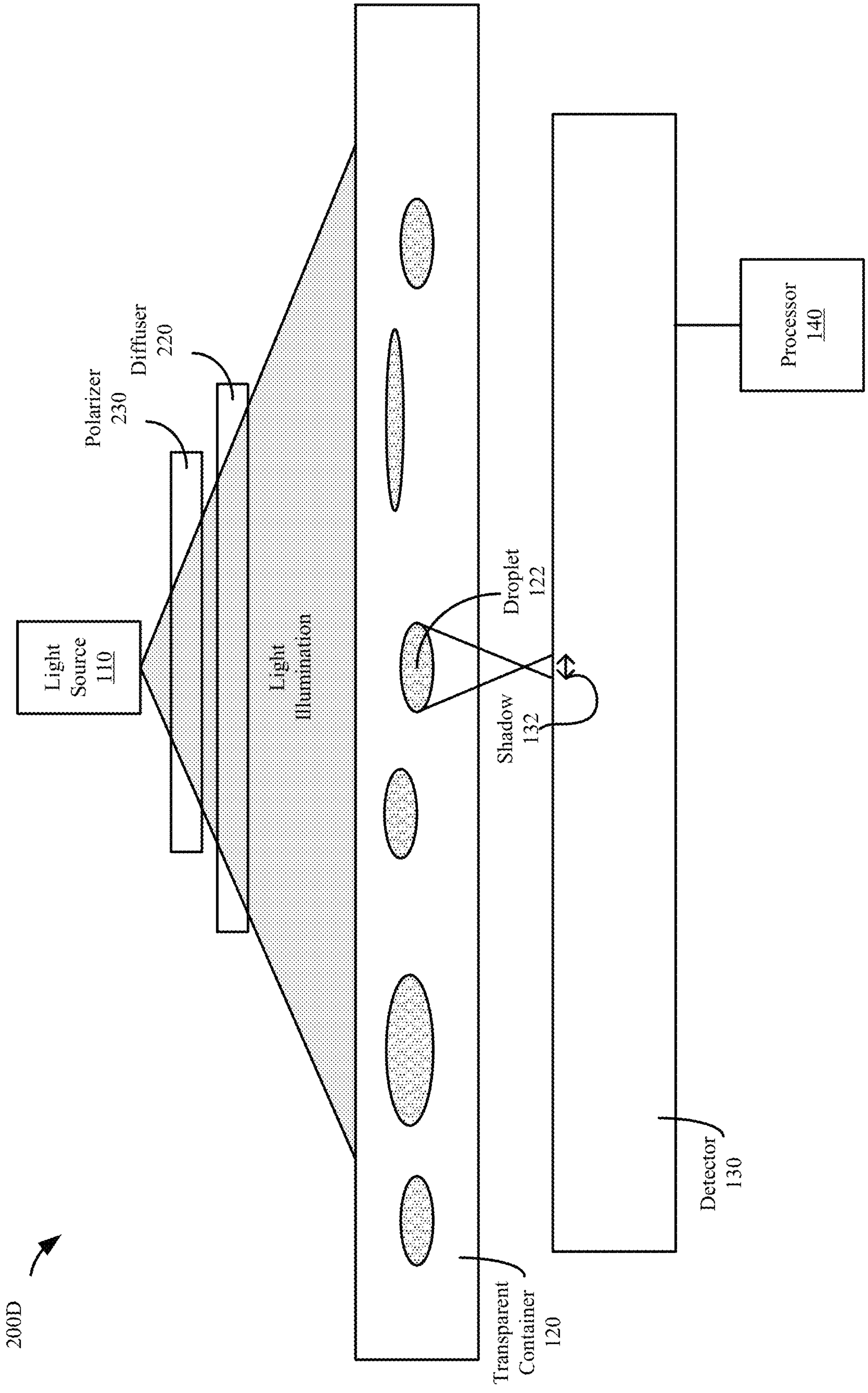
Figure 2E:
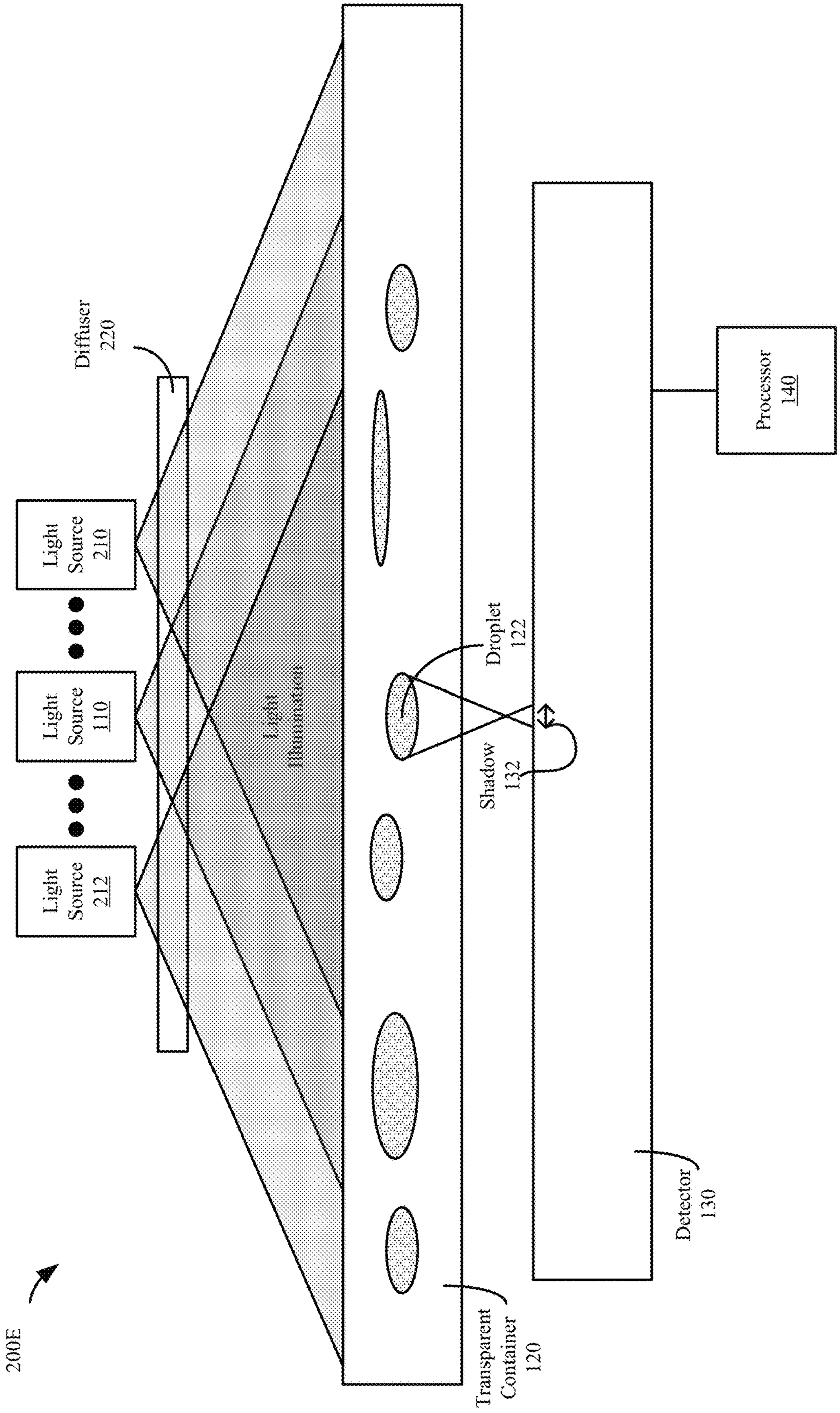
Figure 2F:
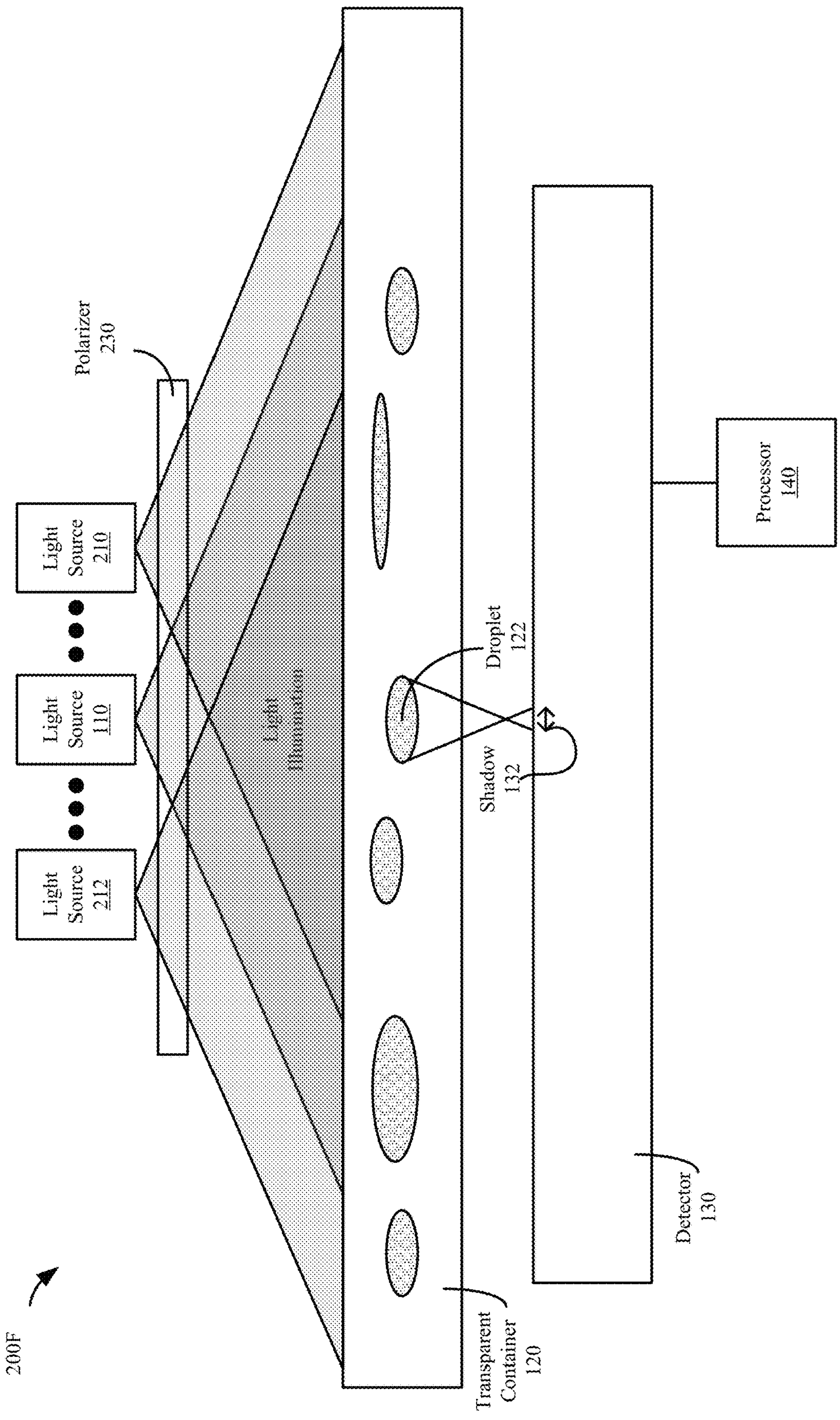
Figure 2G:
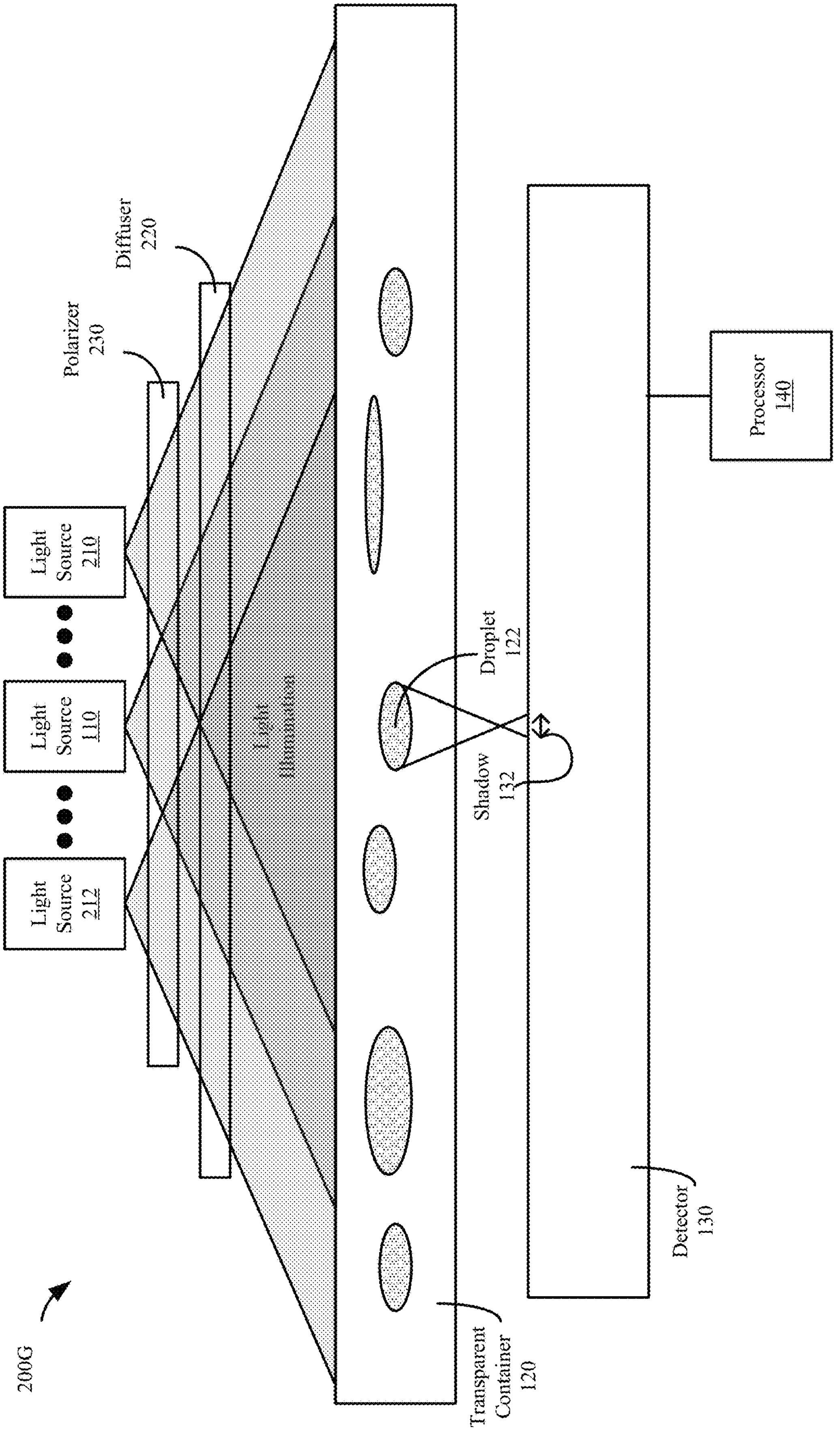
Figure 2H:
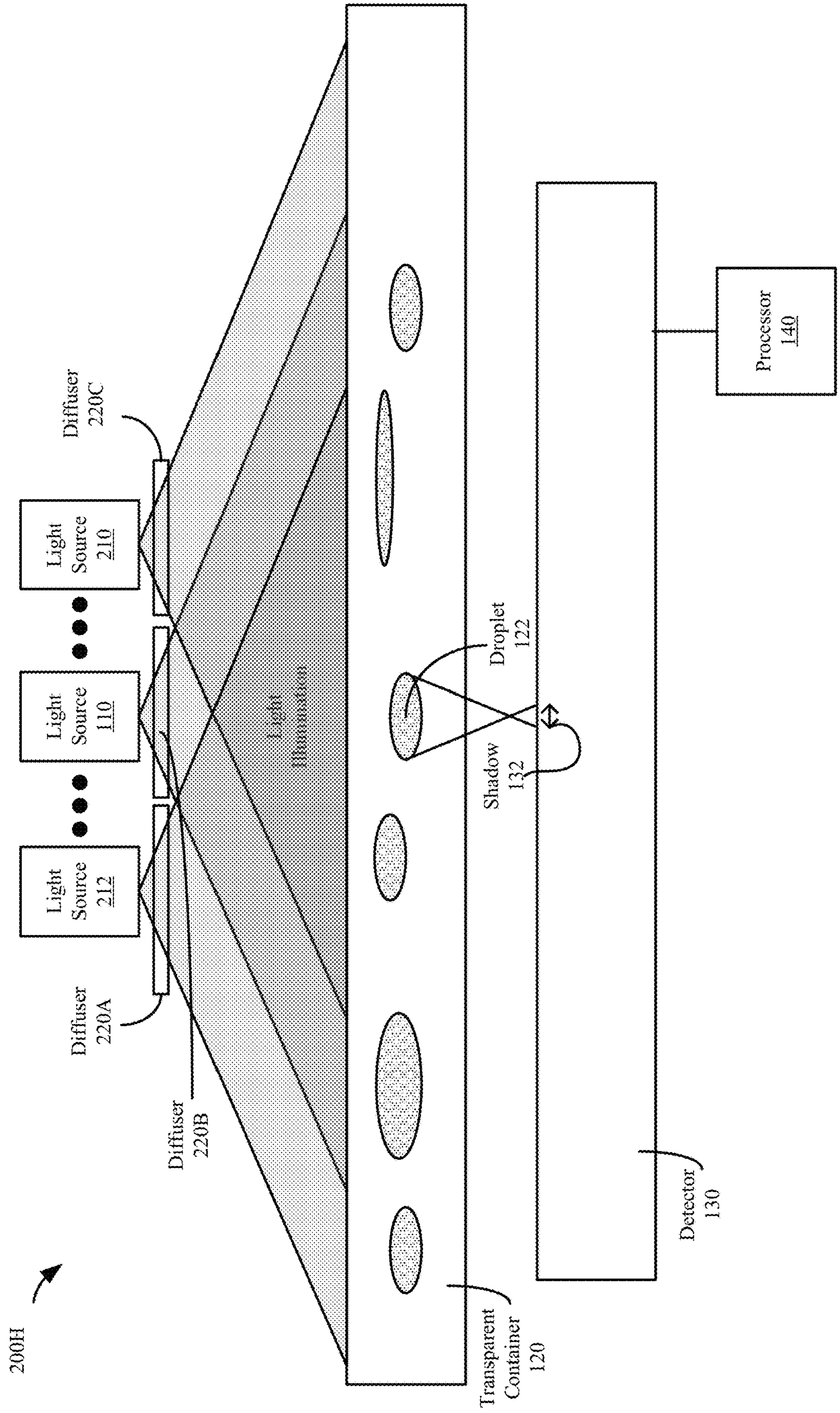
Figure 2I:
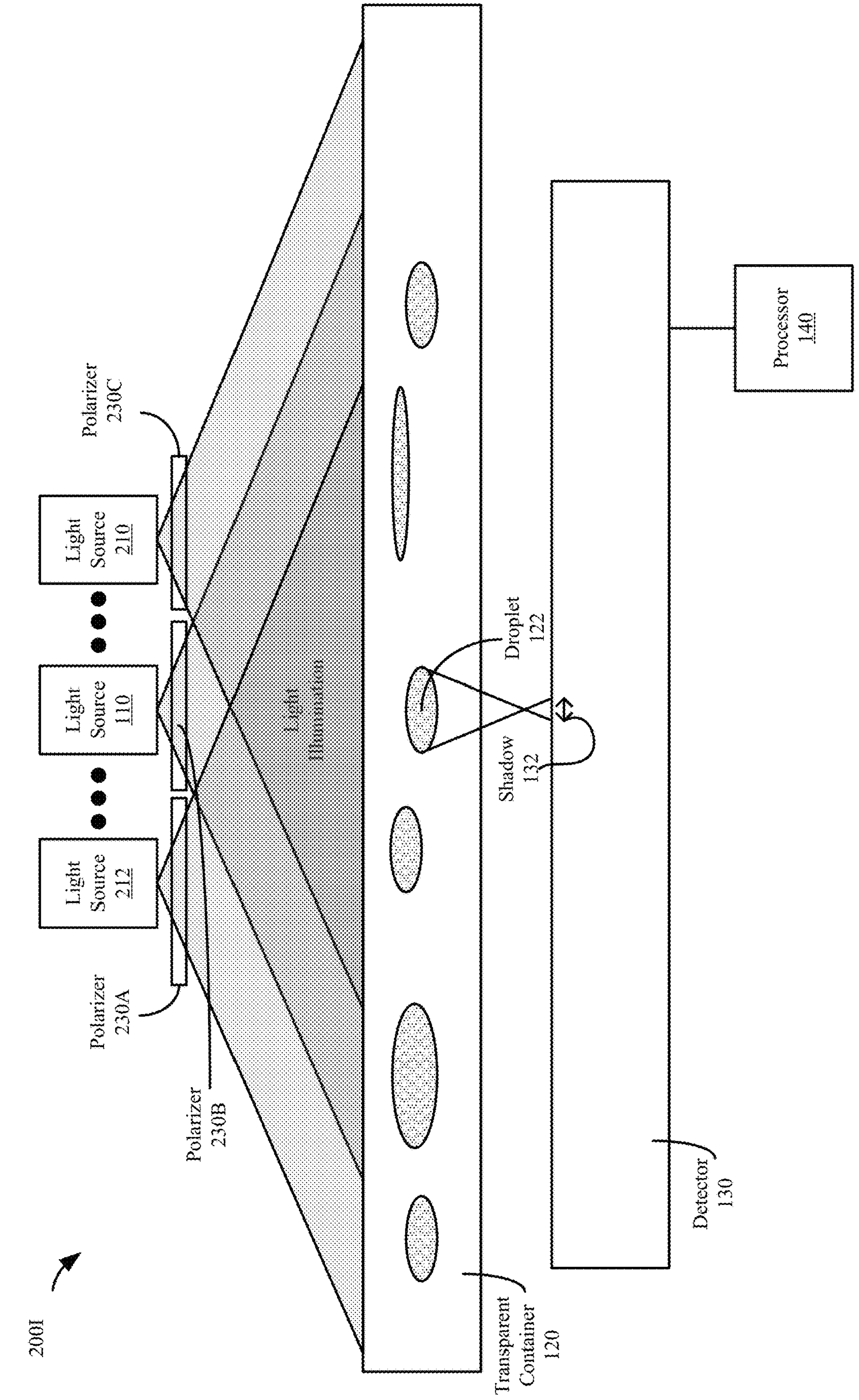
Figure 2J:
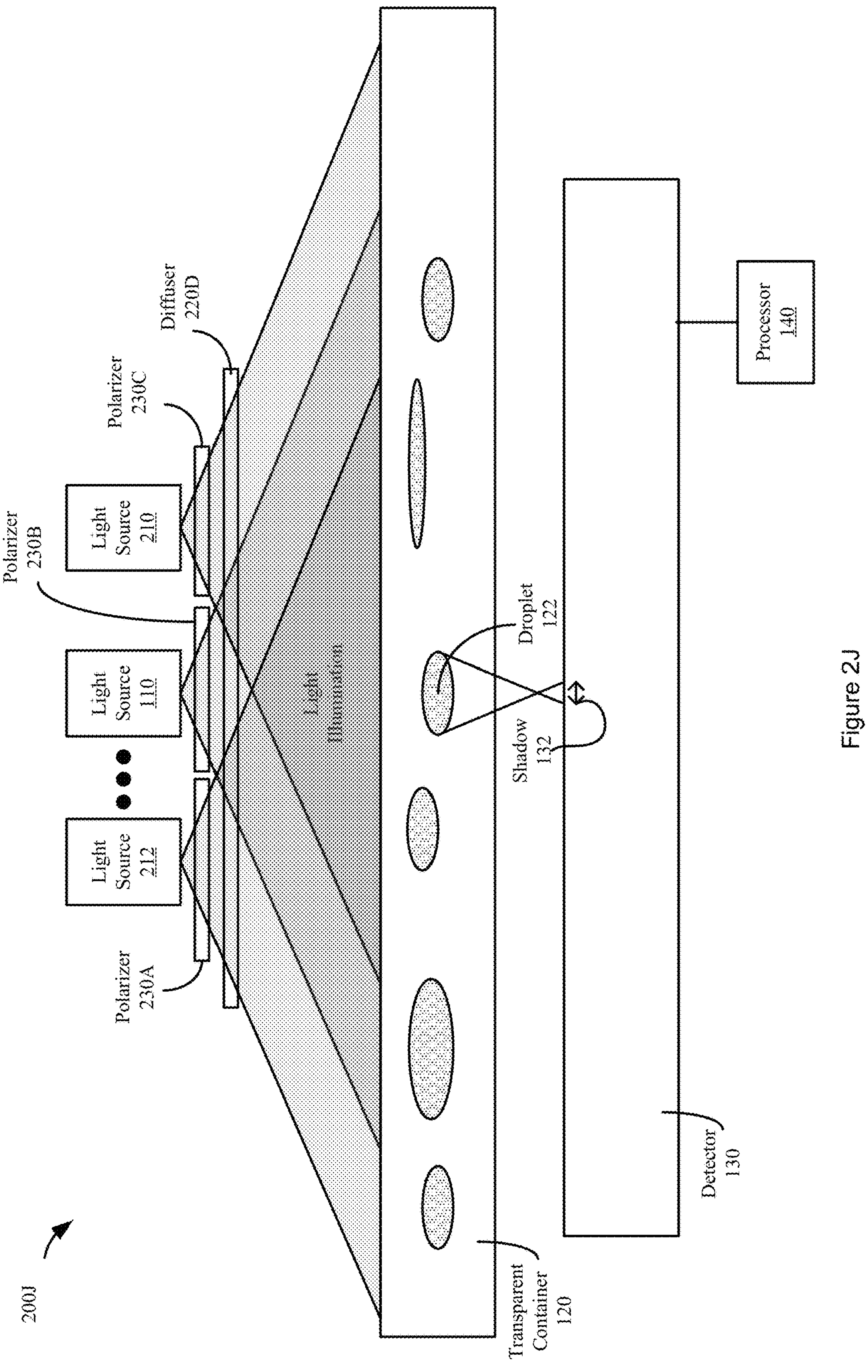

The system 200D of FIG. 2D is a combination of FIGS. 2B and 2C. The system 200D includes both the polarizer 230 and the diffuser 220. The system 200E of FIG. 2E is similar to FIG. 2A but it includes the diffuser 220. It is appreciated that one diffuser 220 is shown for illustrative purposes and should not be construed as limiting the scope of the embodiments. For example, each light source may has its respective diffuser that may or may not be the same as other diffusers associated with other light sources. The system 200F of FIG. 2F is similar to FIG. 2A but it includes the polarizer 230. It is appreciated that one polarizer 230 is shown for illustrative purposes and should not be construed as limiting the scope of the embodiments. For example, each light source may have its respective polarizer that may or may not be the same as other polarizers associated with other light sources. The system 200G of FIG. 2G is a combination of FIGS. 2E and 2F and includes both the polarizer 230 and diffuser 220 that are coupled to the light sources. As described above, the illustration of only one polarizer and one diffuser for the plurality of light sources is for illustrative purposes and should not be construed as limiting the scope of the embodiments. For example, each light source may have its own corresponding diffuser and/or polarizer that may or may not be the same as other polarizers and/or diffusers associated with other light sources. The system 200H is similar to system 200B except that each light source has its own respective diffuser. For example, diffuser 220A is associated with the light source 212, diffuser 220B is associated with the light source 110, and diffuser 220C is associated with the light source 210. The system 200I is similar to system 200C except that each light source has its own respective polarizer. For example, polarizer 230A is associated with the light source 212, polarizer 230B is associated with the light source 110, and polarizer 230C is associated with the light source 210. The system 200J of FIG. 2J is a combination of systems 200H and 200I.

It is appreciated that the position of the polarizer and/or diffuser is for illustrative purposes. For example, the polarizer and/or diffuser may be positioned anywhere on the optical path. Moreover, it is appreciated that use of polarizer and/or diffuser is for illustrative purposes and that other components, e.g., a filter, etc., may be used. Moreover, it is appreciated that a bandpass filter may be in conjunction with the system setup above for FIGS. 2A-2J.

Figure 3:
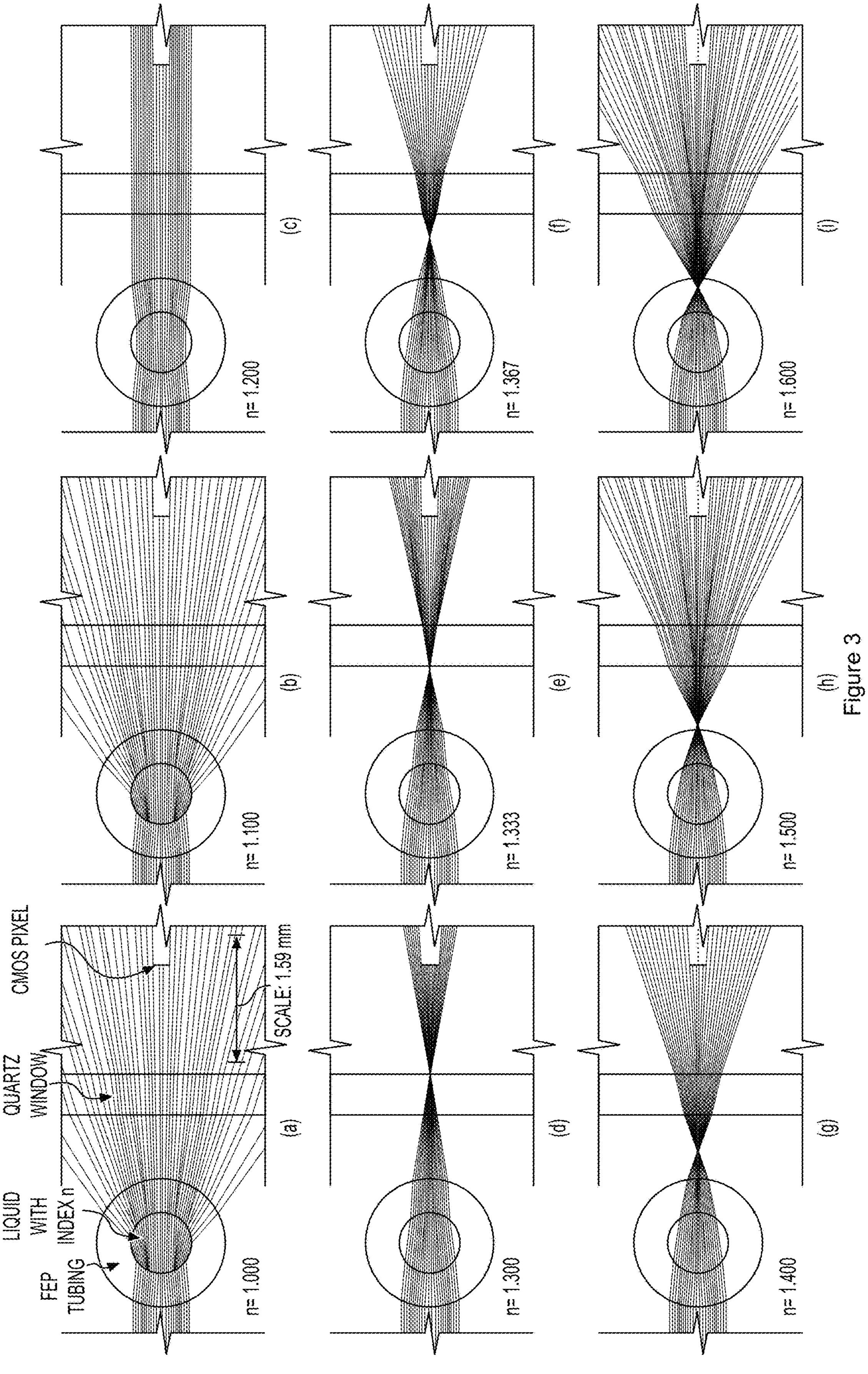
FIG. 3 shows a model generated optical effect associated with a hardware-based system configured to measure data associated with phase entrainment in a multi-liquid extraction system according to one aspect of the present embodiments.

FIG. 3 shows a model generated optical effect associated with a hardware-based system configured to measure data associated with components in a liquid, such as phase entrainment in a multi-liquid extraction system according to one aspect of the present embodiments, and solute concentrations in other embodiments. According to some embodiments, software may be used to investigate light divergence/convergence and as it changes for different refractive indices (e.g., n=1, 1.1, 1.2, 1.3, 1.333, 1.367, 1.4, 1.5, and 1.6). For example, FIG. 3 shows a model generated based on the system, as described in FIG. 1A. The dimensions of the transparent container 120 is considered among other factors. In this nonlimiting example, the light source is a 2D bundle that fans out to mimic divergent light from an LED light source. However, it is appreciated that other models may be considered depending on a different light source, e.g., laser. The bundle in this nonlimiting example is rectangular in shape that overfills the cylindrical shaped transparent container 120. It is appreciated that a virtual detector that matches the detector of FIG. 1A is used (here a CMOS pixel is shown for illustrative purposes and the virtual detector is 28.672 mm along the length of the transparent container and 200 microns traversing the transparent container). In this nonlimiting example, a random Monte Carlo ray generation is used but it is appreciated that a deterministic ray generation may also be used. It is appreciated that the number of rays reaching the detector measures optical intensity. As illustrated, the ideal distance between the transparent container and the detector was determined to be 1.6 mm for the various refractive indices (ranging from n=1 to 1.6) modeled that resulted in large changes in light intensities. It is appreciated that other models may determine the distance to be different from the one that has been determined for FIG. 1A. The model can therefore be used to determine the setup distance between the transparent container 120 and the detector 130 of the system as illustrated in FIG. 1A.

Figure 4:
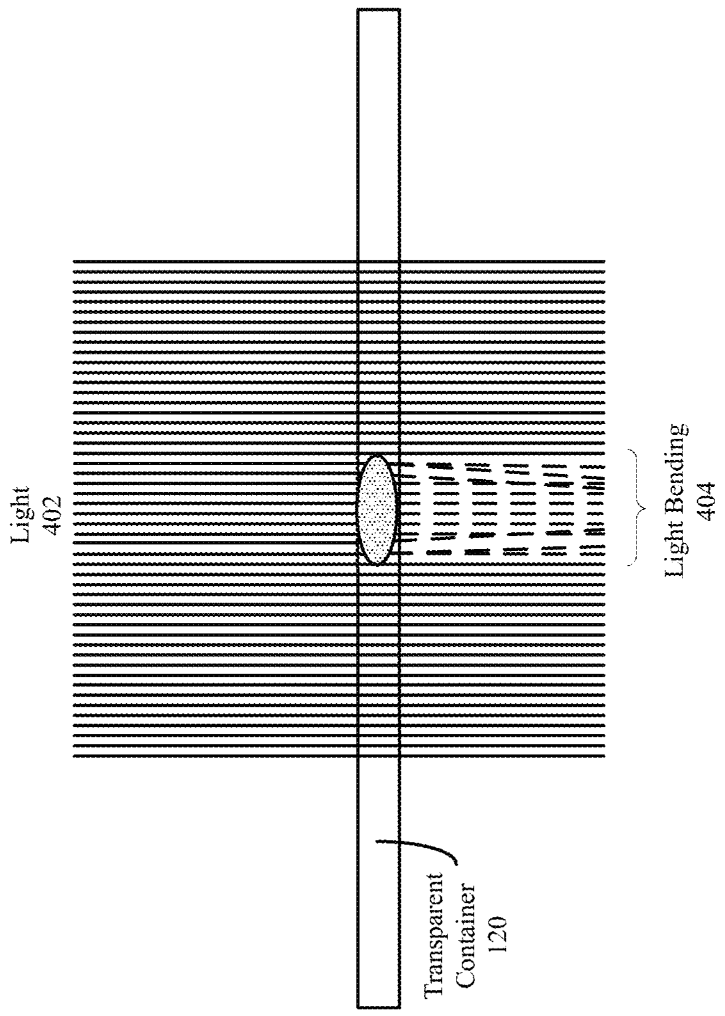
FIG. 4 shows a model generated optical effect associated with light refraction associated with droplets according to one aspect of the present embodiments.

Referring now to FIG. 4, a model generated optical effect associated with light refraction associated with droplets according to one aspect of the present embodiments is shown. A 3-D model is generated to evaluate the optical effects of droplet menisci. In this nonlimiting example, the model presumes that the transparent container 120 is filled with water and spherical endcap of water with diameter equal to the inner diameter of the cylindrical transparent container 120. As illustrated the droplet that is formed bends the light toward it (light bending 404) due to a larger refractive index while the light 402 (e.g., 1D bundle of parallel array in this model) that travels through areas without the droplets do not because of absence of menisci (i.e., droplet curvature). The generated model illustrates that presence of droplets results in a local increase in light intensity, thereby forming the peaks as described above. It is appreciated that use of different liquids with different refractive indices might provide a different result and may be investigated in order to determine whether the droplets bend the light toward them or away from them, which depends on the refractive indices of the liquid(s) and/or solute.

Figure 5:
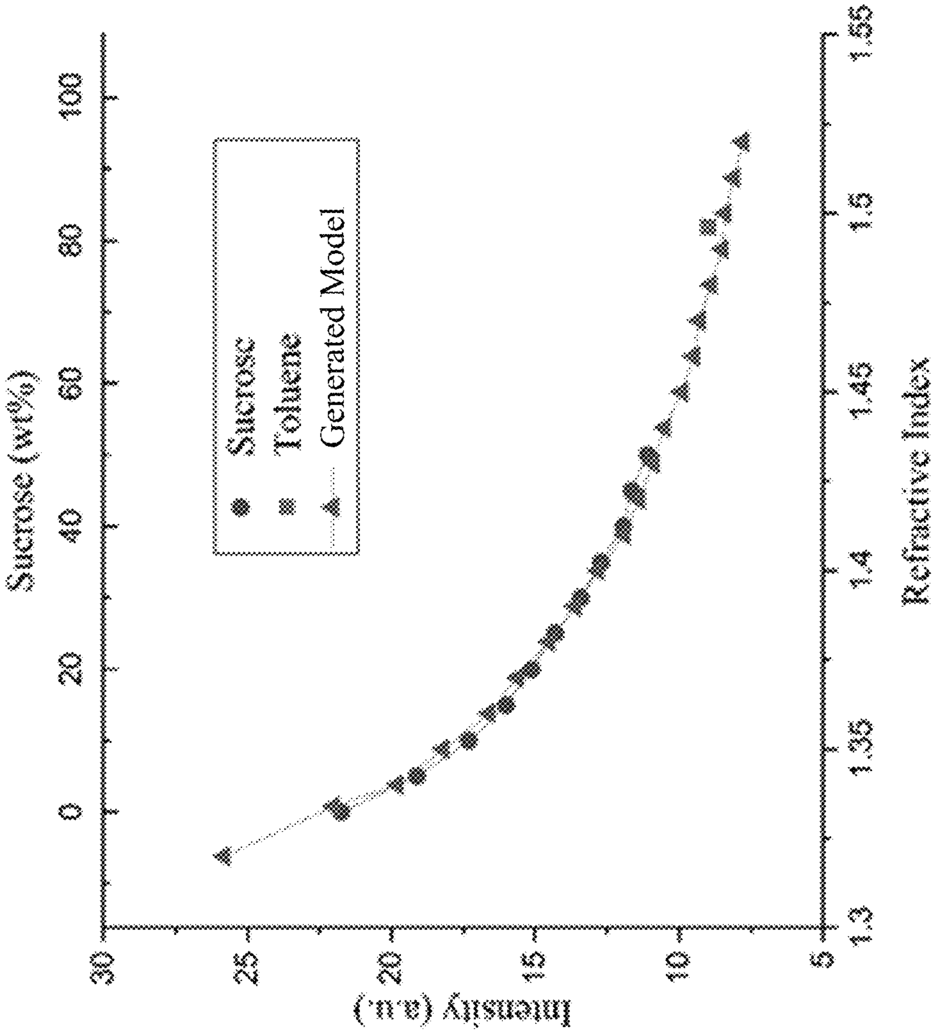
FIG. 5 shows a model generated for an illustrative multi-liquid extraction system used to determine liquid concentrations according to one aspect of the present embodiments.

FIG. 5 shows a model generated for an illustrative system used to determine solute concentrations according to one aspect of the present embodiments. In some embodiments, a model may be generated empirically by mixing different liquid concentrations or different solutes in liquid and by measuring their respective refractive index and their light intensities. In some embodiments, the model may be generated using a software by inputting the system data, e.g., dimensions of the transparent container 120, the location and position of the light source 110, whether the light is polarized and diffused or not, type(s) of liquid and/or solute and concentration, distance between the transparent container 120 and the detector (in this example 1.6 mm), etc. The software may then generate the corresponding refractive index and light intensities for each concentration.

In this nonlimiting example, the generated model for water and sucrose solution is provided and compared to toluene. As illustrated the light intensity decreases as the amount of sucrose increases in water due to an increase in its refractive index. It is appreciated that the model once generated can be used to determine the concentration of liquid(s) and/or solute. For illustrative purposes, the setup of FIG. 1A may be used and an average light intensity may be measured. Once the light intensity (or average) is measured, it can be compared by a processor to the generated model, or in some embodiments to a comparative sample being measured in real time. For illustrative purposes the measured light intensity may be 12.5 a.u. The processor may use the model and by matching the measured light intensity of 12.5 a.u. to the generated model. As such, the refractive index is determined to be 1.4 and the concentration of sucrose is determined to be close to 30% by weight. Accordingly, the measured light intensity may be used along with the generated model to determine the concentration of liquid and solute in this example. In some nonlimiting example, the refractive index may be measured and used to determine the intensity and/or concentration of sucrose.

It is appreciated that variation in the described embodiments above may provide additional information. For example, spectroscopy may be used where the light source is approximately 780 nm in wavelength. In some nonlimiting examples, the light source may include a color metric species that may excite a particular wavelength and/or light (i.e. color) when illuminating the liquid and/or droplets within the transparent container. As such, variation in color and/or wavelength may also provide additional information regarding the liquid and/or droplets within the liquid. In some embodiments, the variation in color and/or wavelength may provide additional information regarding species present within the liquid flowing through the transparent container. In some embodiments, quantum dots may be used that are nanometer in size with optical and/or electrical properties where when illuminated by ultraviolet (UV) light, an electron in the quantum dot can be excited to a state of higher energy, thereby providing different kind of information regarding the liquid and/or droplets and/or species within the liquid.

Figure 6:
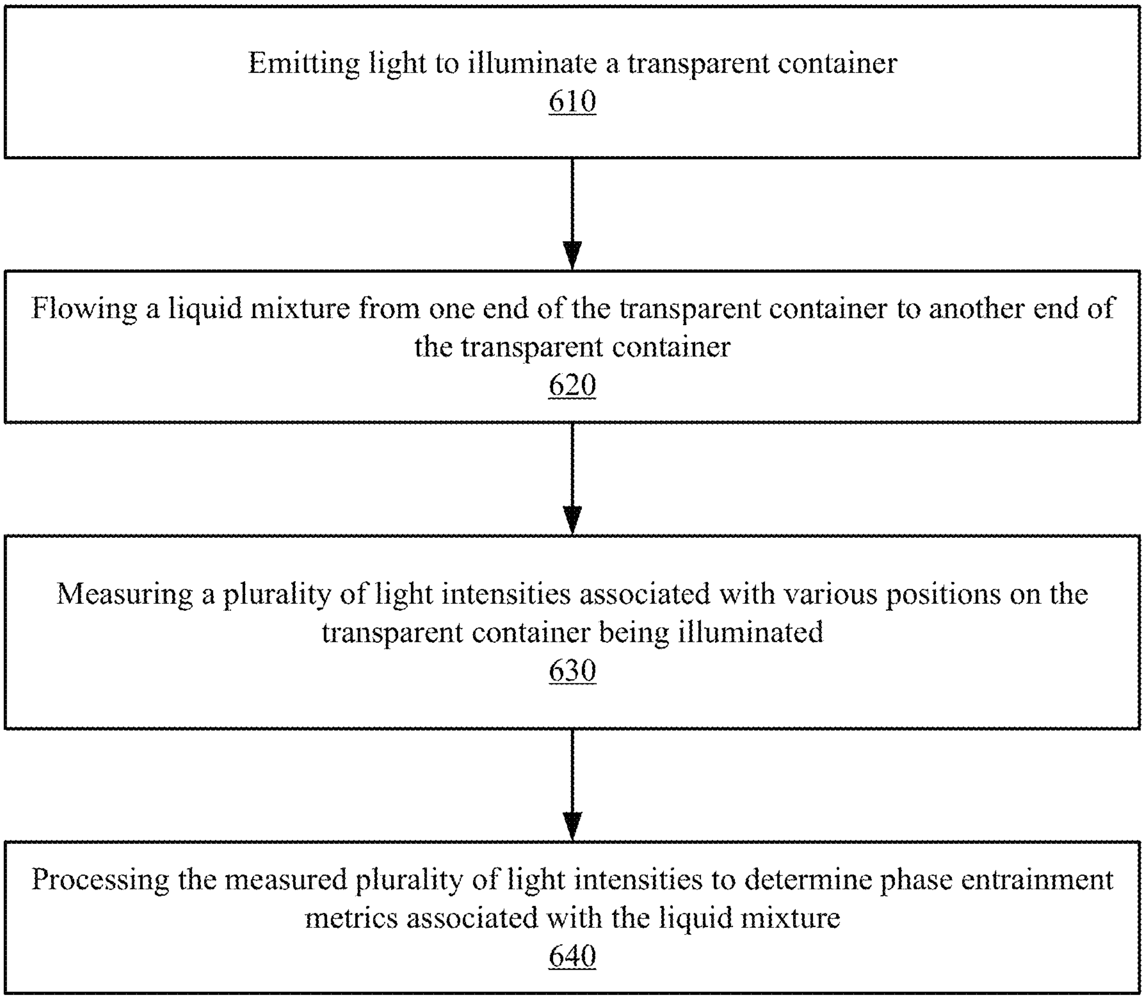
FIG. 6 depicts a flow diagram for determining phase entrainment metrics according to some nonlimiting embodiments.

FIG. 6 depicts a flow diagram for determining phase entrainment metrics according to some nonlimiting embodiments. At step 610, light is emitted to illuminate a transparent container. It is appreciated that the light may be homogenized, polarized, etc., as needed. In some embodiments, the wavelength and angle of the light being emitted may be changed depending on the liquid(s) and/or solute being analyzed and processed. It is further appreciated that in some embodiments, more than one light source may be used with different wavelengths to illuminate the transparent container simultaneously or in sequence. At step 620, a liquid mixture flows from one end of the transparent container to another end of the transparent container. It is appreciated that the liquid mixture may include a first component and a second component that are different from one another, such as a first liquid and a second liquid in embodiments or a liquid and a solute in other embodiments. Accordingly, in embodiments, one or more droplets including the second component (e.g., second liquid) are formed within the transparent container as the liquid mixture flows from the one end to the other end of the transparent container. At step 630, a plurality of light intensities associated with various positions on the transparent container being illuminated is measured. According to some embodiments, a light intensity associated with a portion of the liquid mixture that includes the one or more droplets is different from a light intensity associated with another portion of the liquid mixture that does not include the one or more droplets. At step 640, the measured plurality of light intensities is processed to determine phase entrainment metrics associated with the liquid mixture. It is appreciated that the phase entrainment metrics include one or more of a number of phase entrainments, bulk phase presence, and concentration associated with the first liquid and the second liquid. It is appreciated that in some embodiments the sensor detects air with the refractive index of $n=1$ and a bubble of air in the sensor may yield a different intensity from that of liquid with a different refractive index. In some embodiments, the number of phase entrainments may be based on a number of peaks detected in the plurality of light intensities. In some nonlimiting examples, the bulk phase presence is based on determining a ratio of a light intensity associated with the one or more droplets to a light intensity associated with liquid in absence of the one or more droplets. In some embodiments, concentrations of soluble or liquid(s) may be determined by comparing the plurality of light intensities to a generated model to identify a match between the measured plurality of light intensities and one or more light intensities of the generated model. A refractive index associated with the matched light intensity is determined and a concentration associated with the first liquid and the second liquid based on the refractive index is subsequently determined.

Figure 7:
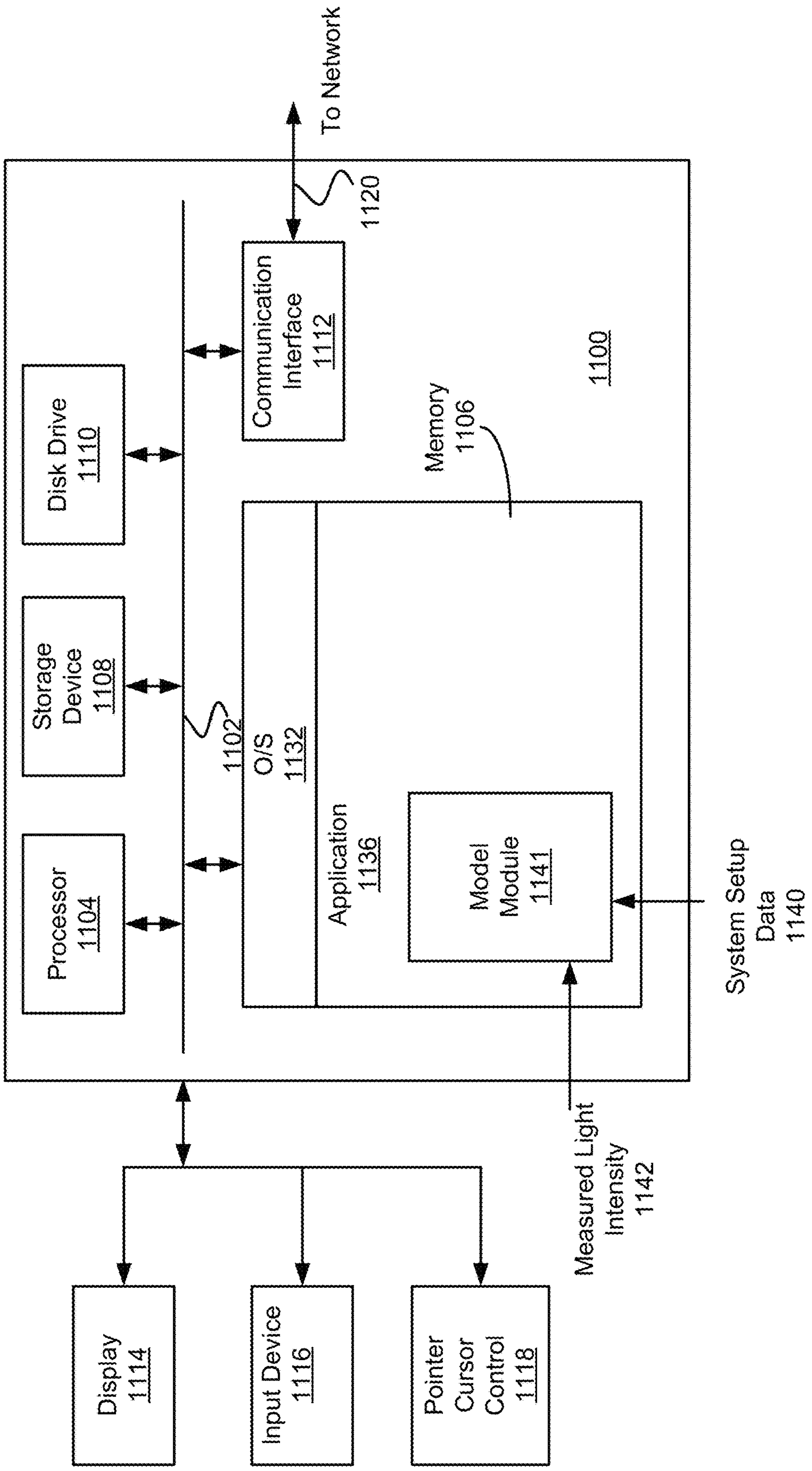
FIG. 7 shows a block diagram depicting an example of computer system suitable for determining liquid concentration in accordance with some embodiments.

FIG. 7 is a block diagram depicting an example of computer system suitable for determining liquid concentration in accordance with some embodiments. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be coupled by one or more networks. When the software instructions are executed, the one or more hardware components become a special purposed hardware component for determining the liquid concentration.

In some examples, computer system 1100 can be used to implement computer programs, applications, methods, processes, or other software to perform the above-described techniques and to realize the structures described herein. Computer system 1100 includes a bus 1102 or other communication mechanism for communicating information, which interconnects subsystems and devices, such as a processor 1104, a system memory ("memory") 1106, a storage device 1108 (e.g., ROM), a disk drive 1110 (e.g., magnetic or optical), a communication interface 1112 (e.g., modem or Ethernet card), a display 1114 (e.g., CRT or LCD), an input device 1116 (e.g., keyboard), and a pointer cursor control 1118 (e.g., mouse or trackball). In one embodiment, pointer cursor control 1118 invokes one or more commands that, at least in part, modify the rules stored, for example in memory 1106, to define the electronic message preview process.

According to some examples, computer system 1100 performs specific operations in which processor 1104 executes one or more sequences of one or more instructions stored in system memory 1106. Such instructions can be read into system memory 1106 from another computer readable medium, such as static storage device 1108 or disk drive 1110. In some examples, hard-wired circuitry can be used in place of or in combination with software instructions for implementation. In the example shown, system memory 1106 includes modules of executable instructions for implementing an operating system ("OS") 1132, an application 1136 (e.g., a host, server, web services-based, distributed (i.e., enterprise) application programming interface ("API"), program, procedure or others). Further, application 1136 includes a module of executable instructions associated with model module 1141 to generate one or more models based on the system setup data 1140 (as described above). Once the model is generated, the model module 1141 may receive the measured light intensity 1142 and compare that to the previously generated model (or in some embodiments a real time measurement being made on a comparative sample) to determine the refractive index and the concentration associated with the measured light intensity. As such, the concentration, e.g., sucrose in water as described above, may be determined using the measured light intensity and by leveraging a previously generated model.

The term "computer readable medium" refers, at least in one embodiment, to any medium that participates in providing instructions to processor 1104 for execution. Such a medium can take many forms, including but not limited to, non-volatile media, volatile media, and transmission media. Non-volatile media includes, for example, optical or magnetic disks, such as disk drive 1110. Volatile media includes dynamic memory, such as system memory 1106. Transmission media includes coaxial cables, copper wire, and fiber optics, including wires that comprise bus 1102. Transmission media can also take the form of acoustic or light waves, such as those generated during radio wave and infrared data communications.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 1100. According to some examples, two or more computer systems 1100 coupled by communication link 1120 (e.g., LAN, PSTN, or wireless network) can perform the sequence of instructions in coordination with one another. Computer system 1100 can transmit and receive messages, data, and instructions, including program code (i.e., application code) through communication link 1120 and communication interface 1112. Received program code can be executed by processor 1104 as it is received, and/or stored in disk drive 1110, or other non-volatile storage for later execution. In one embodiment, system 1100 is implemented as a hand-held device. But in other embodiments, system 1100 can be implemented as a personal computer (i.e., a desktop computer) or any other computing device. In at least one embodiment, any of the above-described delivery systems can be implemented as a single system 1100 or can implemented in a distributed architecture including multiple systems 1100.

In other examples, the systems, as described above can be implemented from a personal computer, a computing device, a mobile device, a mobile telephone, a facsimile device, a personal digital assistant ("PDA") or other electronic device.

In at least some of the embodiments, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, Python, and others. These can be varied and are not limited to the examples or descriptions provided.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A system comprising:

a light source configured to emit light;

a transparent container configured to flow liquid from one end of the transparent container to another end of the transparent container, wherein the liquid comprises a first component and a second component, and wherein a flow rate of the liquid is adjusted based on dynamic viscosity of the liquid, interfacial tensions, density of the liquid, capillary number, Reynolds number, and a shape of the transparent container to ensure phase entrainment to appear as one or more droplets in a squeezing and non-turbulent form within the liquid as the liquid flows within the transparent container and from the one end to the another end of the transparent container;

a detector configured to measure light intensities from the transparent container being illuminated by the light source, wherein the one or more droplets cast one or more shadows on the detector, and wherein a light intensity associated with a portion of the liquid that includes the one or more droplets is different from a second light intensity associated with another portion of the liquid that does not include the one or more droplets; and a processor coupled to the detector and configured to process the measured light intensities to determine phase entrainment metrics associated with the liquid, wherein the phase entrainment metrics include one or more of number of phase entrainments, bulk phase presence, and concentration associated with the first component and the second component, wherein the processor is configured to determine a ratio of a light intensity associated with the one or more droplets to a light intensity associated with liquid in absence of the one or more droplets, wherein the ratio is associated with the bulk phase presence.

2. The system of claim 1, wherein the processor is configured to determine the number of phase entrainments based on a number of light intensities that form a peak in comparison to a remainder of the light intensities.

3. The system of claim 1, wherein the processor is configured to compare the measured light intensities to a generated model to identify a match between the measured light intensities and a light intensity of the generated model, wherein the matched light intensity is associated with a refractive index that corresponds to a particular concentration associated with the first component and the second component.

4. The system of claim 1, wherein the first component and the second component are each liquid or the first component is a liquid solvent and the second component is a solute.

5. The system of claim 1 further comprising a diffuser coupled to the light source configured to homogenize the light.

6. The system of claim 1, wherein the light source includes one or more of a light emitting diode (LED), a white light source, and a laser light source.

7. The system of claim 1 further comprising a polarizer coupled to the light source configured to polarize the light.

8. The system of claim 1, wherein the detector includes one or more of a linear complementary metal-oxide-semiconductor (CMOS) array and a linear charged coupled detector (CCD) array.

9. The system of claim 1, wherein the transparent container includes a cylindrical tubing.

10. A system comprising:

a light source configured to emit light;

a transparent container configured to flow a liquid mixture from one end of the transparent container to another end of the transparent container in a liquid-liquid extraction system, wherein the liquid mixture comprises a first liquid and a second liquid that are different from one another, and wherein a flow rate of the liquid mixture is adjusted based on dynamic viscosity of the liquid mixture, interfacial tensions, density of the liquid mixture, capillary number, Reynolds number, and a shape of the transparent container to ensure phase entrainment appear as one or more droplets in a squeezing and non-turbulent form within the liquid mixture as the liquid mixture flows within the transparent container and from the one end to the another end of the transparent container;

a sensor configured to measure a plurality of light intensities associated with the transparent container being illuminated by the light source, wherein a light intensity associated with a portion of the liquid mixture that includes the one or more droplets is different from a light intensity associated with another portion of the liquid mixture that does not include the one or more droplets; and a processor coupled to the detector and configured to process the measured plurality of light intensities to determine phase entrainment metrics associated with the liquid mixture, wherein the phase entrainment metrics include one or more of number of phase entrainments, bulk phase presence, and concentration associated with the first liquid and the second liquid, wherein the processor is configured to determine a ratio of a light intensity associated with the one or more droplets to a light intensity associated with liquid in absence of the one or more droplets, wherein the ratio is associated with the bulk phase presence.

11. The system of claim 10, wherein the processor is configured to determine the number of phase entrainments based on a number of light intensities that form a peak in comparison to a remainder of light intensities of the plurality of light intensities.

12. The system of claim 10, wherein the processor is configured to compare the plurality of light intensities to a generated model to identify a match between the measured plurality of light intensities and one or more light intensities of the generated model, wherein the matched light intensity is associated with a refractive index that corresponds to a concentration associated with the first liquid and the second liquid.

13. The system of claim 10 further comprising a diffuser coupled to the light source configured to homogenize the light.

14. The system of claim 10, wherein the light source includes one or more of a light emitting diode (LED), a white light source, and a laser light source.

15. The system of claim 10 further comprising a polarizer coupled to the light source configured to polarize the light.

16. The system of claim 10, wherein the detector includes one or more of a linear complementary metal-oxide-semiconductor (CMOS) array and a linear charged coupled detector (CCD) array.

* * * * *